United States Patent [19]
Kashima et al.

[11] Patent Number: 5,688,035
[45] Date of Patent: Nov. 18, 1997

[54] BACKLIGHTING DEVICE FREE OF A BRIGHT LINE

[75] Inventors: Keiji Kashima, Saitama; Naoki Yoshida, Kanagawa, both of Japan

[73] Assignee: Tosoh Corporation, Yamaguchi, Japan

[21] Appl. No.: 721,848

[22] Filed: Sep. 30, 1996

Related U.S. Application Data

[62] Division of Ser. No. 408,285, Mar. 22, 1995, abandoned.

[30] Foreign Application Priority Data

Mar. 23, 1994 [JP] Japan ................................. 6-051664
Sep. 22, 1994 [JP] Japan ................................. 6-227799

[51] Int. Cl.⁶ ................................................. F21V 33/00
[52] U.S. Cl. ......................... 362/31; 362/26; 362/330
[58] Field of Search ................................. 362/31, 26, 29, 362/223, 330

[56] References Cited

U.S. PATENT DOCUMENTS

| | | | |
|---|---|---|---|
| 3,875,396 | 4/1975 | Webb | 240/6.4 B |
| 4,751,615 | 6/1988 | Abrams | 362/31 |
| 4,811,507 | 3/1989 | Blanchet | 362/31 |
| 4,949,489 | 8/1990 | Rudell et al. | 40/546 |
| 5,093,765 | 3/1992 | Kashima et al. | 362/31 |
| 5,115,383 | 5/1992 | Lee | 362/109 |
| 5,132,549 | 7/1992 | Yokoyama | 362/31 |
| 5,262,928 | 11/1993 | Kashima et al. | 362/26 |
| 5,289,351 | 2/1994 | Kashima et al. | 363/26 |
| 5,363,294 | 11/1994 | Yamamoto et al. | 362/26 |

FOREIGN PATENT DOCUMENTS

| | | |
|---|---|---|
| 0355064 | 2/1990 | European Pat. Off. . |
| 0442529 | 8/1991 | European Pat. Off. . |
| 0500089 | 8/1992 | European Pat. Off. . |
| 0504910 | 9/1992 | European Pat. Off. . |
| 2652667 | 4/1991 | France . |
| 2165631 | 4/1986 | United Kingdom . |

*Primary Examiner*—James C. Yeung
*Assistant Examiner*—Alfred Basichas
*Attorney, Agent, or Firm*—Sughrue,Mion,Zinn,Macpeak & Seas, PLLC

[57] ABSTRACT

A light reflector covers a linear light source that is disposed adjacent to a light incident end face of a light conducting plate. The interval between the end portions of the light reflector adjacent to the light incident end face of the light conducting plate is made smaller than the thickness of the light incident end face. Alternatively, the light-exit-side portion of the light reflector located between the linear light source and the light incident end face of the light conducting plate is disposed within the thickness of the light incident end face.

10 Claims, 3 Drawing Sheets

5,688,035

BACKLIGHTING DEVICE FREE OF A BRIGHT LINE

This is a Divisional of application Ser. No. 08/408,285 filed Mar. 22, 1995, now abandoned.

BACKGROUND OF THE INVENTION

The present invention relates to a backlighting device for illuminating a transmission-type or semi-transmission-type panel from its back side.

In recent years, thin and highly legible liquid crystal display devices having a backlighting device are used as display devices for lap-top-type or book-type word processors, computers, or the like. As shown in FIG. 1, edge-light-type backlighting devices are commonly used for that purpose in which devices a linear light source 4 such as a fluorescent tube is disposed adjacent to an end face of a transparent light conducting plate 1. In many of the edge-light-type backlighting devices, as shown in FIG. 2, a light diffusive substance 6 is partially coated on one major surface of the light conducting plate 1, and this major surface is entirely covered with a reflecting plate 3.

In particular, in recent years, with improved performance of word processors and personal computers, display devices are required to be more compact and to be further improved in legibility. In the backlighting device, it is attempted to reduce its overall size by reducing the maximum external dimensions of the light conducting plate 1 with respect to the light-emitting area of the backlighting device which area corresponds to the display area of a liquid crystal display panel.

However, in the backlighting device in which the area (maximum dimensions) of the light conducting plate 1 is reduced with respect to the light-emitting area of the backlighting device, a high-brightness portion (bright line) appears near the end face of the light conducting plate 1 adjacent to the linear light source 4 so as to be parallel with the end face, and deteriorates the luminance uniformity in the light-emitting area, i.e., deteriorates the legibility.

To solve the above problem, it has been proposed to dispose a light absorptive dark or black tape or the like at the position where a bright line appears. However, there occur other problems. For example, the power-luminance conversion efficiency is lowered due to the light absorption characteristic of the dark or black tape or the like.

SUMMARY OF THE INVENTION

An object of the present invention is to provide a backlighting device in which the external dimensions can be made as small as possible with respect to the effective light-emitting area, and which can provide superior legibility.

The inventors have made various investigations into the relationship between the structure around the end face of the light conducting plate 1 adjacent to the linear light source 4 and the luminance distribution of the light exit surface of the light conducting plate 1, and have obtained the knowledge that the bright line occurs in the following manner in the edge-light-type backlighting device. As shown in FIG. 3, light rays, which should undergo repeated total reflection in the light conducting plate 1, are diffuse-reflected by adhesive layers 7, such as double-sided adhesive tapes, which are used to bond, to the light conducting plate 1, the end portions of a light reflector 5 that covers the linear light source 4. Even in the case of not using any adhesive layers such as double-sided adhesive tapes, if gaps are formed between the light conducting plate 1 and the end portions of the light reflector 5 as shown in FIG. 4, light rays reflected by the end portions of the light reflector 5 enter the light conducting plate 1 from its surfaces (top and bottom surfaces) other than the end face and do not satisfy the condition for total reflection. Then, the inventors have found the above-described object of the invention can be attained by properly adapting the contact state (contact portions) of the end portions of the light reflector 5 and the end portions of the light conducting plate 1.

According to the invention, a backlighting device for a panel comprises:

a light conducting plate made of a transparent material, and has a function of outputting light from a light exit major surface thereof;

a linear light source disposed adjacent to at least one end face of the light conducting plate; and a light reflector covering the linear light source, at least portions of the light reflector located between the linear light source and the end face of the light conducting plate having an interval that is smaller than the thickness of the end face.

Alternatively, a light-exit-side portion of the light reflector located between the linear light source and the end face of the light conducting plate is disposed within the thickness of the end face.

Further, the light reflector may be formed of a light reflecting sheet, in which case at least part of a light-exit-side end portion of the light reflecting sheet is bonded to a portion of the light exit major surface of the light conducting plate close to the end face.

DESCRIPTION OF THE PREFERRED EMBODIMENTS

The present invention will be hereinafter described in detail with reference to the accompanying drawings.

Figure 5:
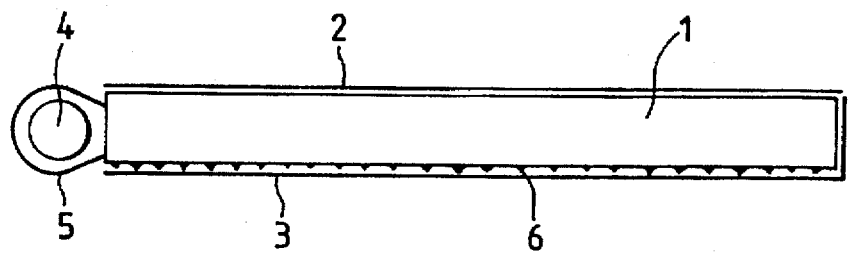
FIG. 5 is a sectional view of a backlighting device according to an embodiment of the present invention.

FIG. 5 is a sectional view of a backlighting device according to an embodiment of the invention. In FIG. 5, a light conducting plate 1 may be made of any material which transmits light efficiently, for instance, quartz, glass, or a transparent natural or synthetic resin such as an acrylic resin. A light diffusing sheet 2 transmits the light output from the surface of the light conducting plate 1 while scattering it. In the invention, one or a plurality of light diffusing sheets are used.

The back major surface B of the light conducting plate 1 is given a function of diffusing the light that is input to the light conducting plate 1. The light diffusing function is provided, for instance, by forming light diffusing elements 6 on the back major surface B. The light diffusing elements 6 may be made of a light scattering substance such as $TiO_2$, $BaSO_4$, $SiO_2$. Preferably, a paint containing a pigment having a large diffuse reflectance, printing ink, or the like is formed in dots on the surface of the light conducting plate 1 by screen printing, for instance. Alternatively, the surface itself of the light conducting plate 1 may be provided with the light diffusing function by coarsening the surface, forming small holes or small protrusions, or by some other means. The light diffusing elements 6 are formed in dots, lines, or some other form so that the light diffusiveness per unit area of the light conducting plate 1 gradually increases as the position goes away from the light source 4. Alternatively, the light diffusing function may be provided in the inside of the light conducting plate 1 by dispersing, for instance, a large number of minute particles whose refractive index is larger than that of the light conducting plate 1.

A light reflecting plate or sheet 3 is so disposed as to cover almost the entire back major surface B of the light conducting plate 1 opposite to the light exit major surface E. The light reflecting plate or sheet 3 may be made of any material which reflects light. Where it is required to be specular, it is made of silver, aluminum, platinum, nickel, chromium, or the like. Preferably, it is composed of a metal plate or a plastic film base of, for instance, polyester and a coat of silver, aluminum, or the like formed thereon by evaporation or sputtering. Where the light reflecting plate or sheet 3 is required to be diffusive, it may be made of any material which diffuse-reflects the incident light. Examples of the material are a resin such as polyester mixed with a light diffusive substance (for instance, $TiO_2$, $BaSO_4$ and $SiO_2$), a resin such as polyester that is foamed to provide light diffusiveness, and a plate made of, for instance, aluminum coated with the above light diffusive substance.

The linear light source (rod-like light source) 4 is disposed adjacent to at least one end face of the light conducting plate 1. Preferably, the linear light source 4 is so disposed that its central axis is substantially parallel with the end face of the light conducting plate 1 to allow the light to enter the light conducting plate 1 through the end face, and the portion of the surface of the linear light source 4 other than the portion opposed to the end face of the light conducting plate 1 is covered by the light reflector 5.

In the invention, the light reflector 5, which covers the linear light source 4, may be any material as long as the portion of its surface opposed to the linear light source 4 is capable of light reflection. Where the light reflector 5 is a specular reflecting plate or sheet, it is made of silver, aluminum, platinum, nickel, chromium, or the like. Preferably, it is composed of a metal plate or a plastic film base of, for instance, polyester and a coat of silver, aluminum, or the like formed thereon by evaporation or sputtering. Where the light reflector 5 is diffuse-reflecting plate or sheet, it may be made of any material which diffuse-reflects the incident light. Examples of the material are a resin such as polyester mixed with a light diffusive substance (for instance, $TiO_2$, $BaSO_4$ and $SiO_2$), a resin such as polyester that is foamed to provide light diffusiveness, and a plate made of, for instance, aluminum coated with the above light diffusive substance.

Examples of the linear light source 4 are a fluorescent tube, a tungsten incandescent tube, an optical rod, and an LED array. Among those examples, the fluorescent tube is preferable. From the viewpoints of the power consumption and the uniformity of the luminance distribution in the effective light-emitting area, it is preferred that the length of the uniform light-emitting portion excluding the electrode portions be approximately equal to the length of the adjacent end face of the light conducting plate 1.

Figure 6:
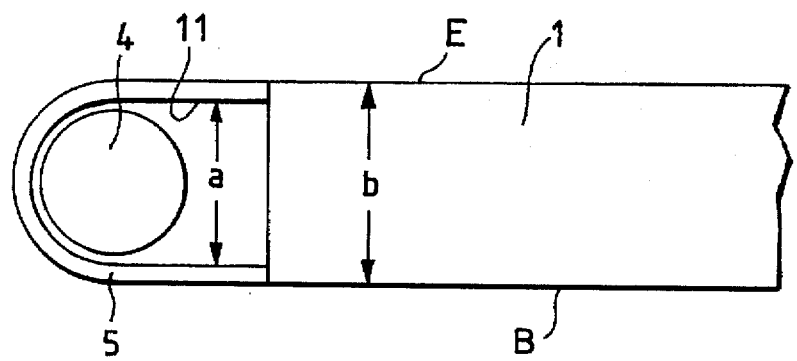
FIGS. 6–10 are sectional views backlighting devices according to embodiments of the invention each of which views of shows a portion of the backlighting device including a light source.

FIG. 6 shows an example of an arrangement of the end portions of the light reflector 5 and the end face of the light conducting plate 1 adjacent to the linear light source 4, which arrangement is a feature of the invention. As shown in FIG. 6, an internal dimension a between at least portions 11 of the light reflector 5, which portions 11 extend between the light source 4 and the end face of the light conducting plate 1, is smaller than a thickness b of the end portion of the light conducting plate 1. Even where the end portions of the light reflector 5 are laid on the light exit of major surface E and the back surface B of the light conducting plate 1, the advantages of the invention can be obtained if the internal dimension a of the light reflector 5 satisfies the above condition.

Figure 1:
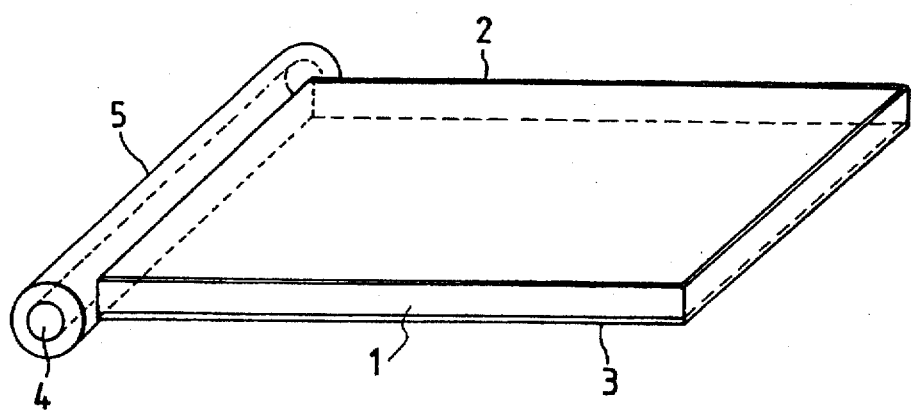
FIG. 1 is a perspective view of a conventional backlighting device.
Figure 2:
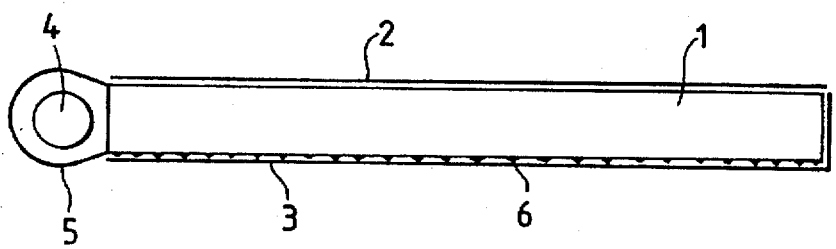
FIG. 2 is a sectional view a conventional backlighting device.
Figure 3:
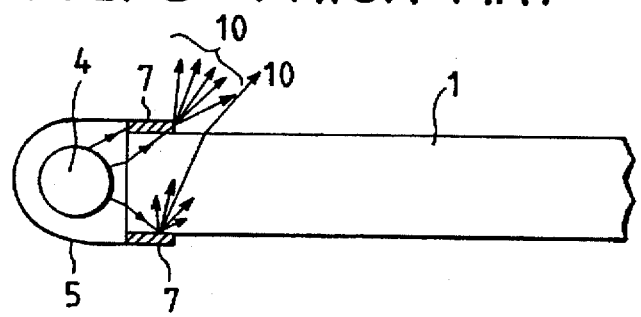
FIGS. 3 and 4 are partial sectional views showing a light source and a portion close thereto of conventional backlighting devices.
Figure 4:
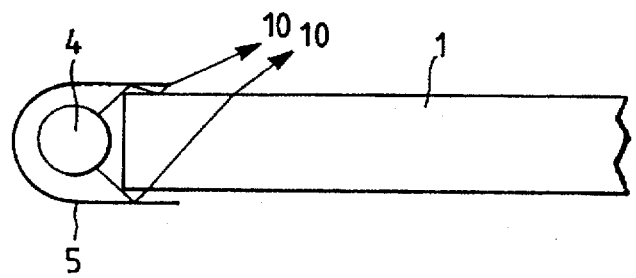

If the internal dimension a of the light reflector 5 is smaller than the thickness b of the light conducting plate 1, the phenomenon shown in FIG. 4 can be prevented wherein light rays reflected by the light reflector 5 enter the light conducting plate 1 through its surfaces (top and bottom surfaces) other than the end face, and take paths that do not satisfy the condition for total reflection in the light conducting plate 1. Thus, the generation of a bright line can be prevented.

The preferred embodiment of the invention will be described below in more detail. In FIG. 6, the end faces of the light reflector 5 on the side of the light conducting plate 1 are substantially in contact with the end face of the light conducting plate 1. More preferably, they are at least partially in contact with each other through a very thin air layer (thickness: for instance, less than 0.5 mm and preferably, 0.1 mm to a single-molecule thickness). By providing this state, the light emitted from the linear light source 4 can effectively be introduced into the light conducting plate 1 through its end face.

Having the main constitution as described above, the backlighting device of the invention is particularly used in the liquid crystal panel. Additional preferable constitutions will be described below.

Figure 7:
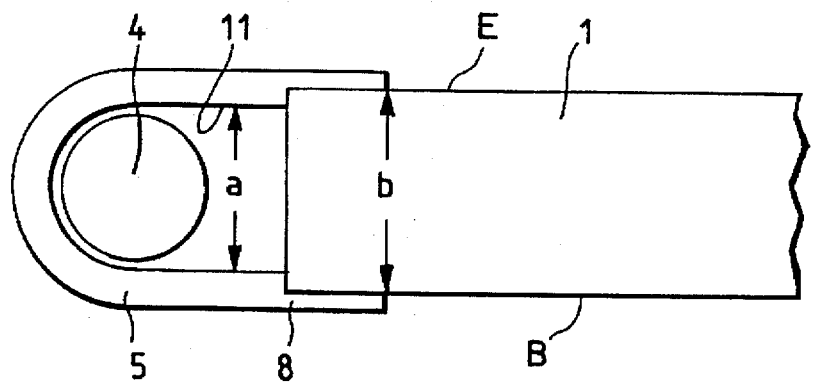

It is preferred that, as shown in FIG. 7, the light reflector 5 covering the linear light source 4 have a step portion 8 that engages the light conducting plate 1. With this configuration, the light reflector 5 and the light conducting plate 1 can be stably connected to each other, improving the ease of operation in mass-production. Also in this case, from the viewpoint of preventing a bright line, it is preferred that a thin air layer exist between the light reflector 5 and the surface of the light conducting plate 1.

Figure 8:
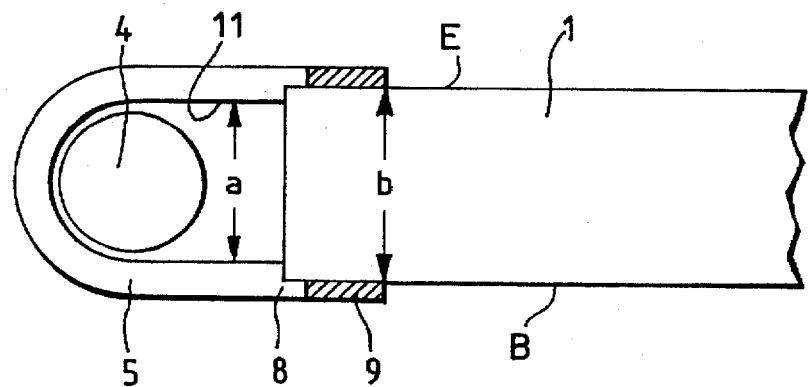

It is also preferred that, as shown in FIG. 8, at least part of the surface of the step portion 8 opposed to the light conducting plate 1 be darkened or blackened so as to absorb light. This configuration is effective in preventing a bright line, because even if there is a gap between the end portion of the light reflector 5 and the light conducting plate 1, the dark or black part 9 of the step portion 8 can absorb light rays traveling through the gap.

Where the light reflector 5 is composed of a plurality of plates or sheets, the end portions of the innermost plate or sheet are so disposed as to satisfy the above-described condition, to provide the same advantages as in the case where the light reflector 5 has the step portion 8.

In the invention, it is preferred that the ratio a/b of the internal dimension a (see FIG. 8) of the light reflector 5 on the side of the light conducting plate 1 to the thickness b of the end portion of the light conducting plate 1 be 0.8 to 1 exclusive. To improve the efficiency of light utilization of the backlighting device, it is preferred that the ratio a/b be 0.9 to 1 exclusive. To efficiently introduce light into the light conducting plate 1, it is preferred that both end portions of the light reflector 5 be located within the thickness of the end portion of the light conducting plate 1.

According to another preferable configuration of the invention, the portion of the light reflector 5 adjacent to the light exit major surface E of the light conducting plate 1 is located within the thickness of the light incident end face of the light conducting plate 1. No particular limitation is imposed on the other end portion of the light reflector 5.

Figure 9:
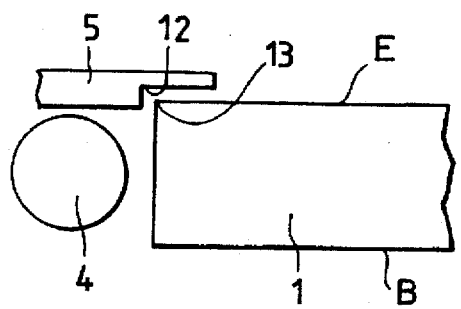

More specifically, where the light reflector 5 has a step portion 12 as described above, the step portion 12 of the end portion of the light reflector 5 adjacent to the light exit major surface E of the light conducting plate 1 is opposed to an edge 13 that is formed by the light incident end face and the light exit major surface E of the light conducting plate 1 (see FIG. 9). With this configuration, the phenomenon shown in FIG. 4 can be prevented wherein light rays reflected by the light reflector 5 enter the light conducting plate 1 through its surface other than the end face, and take paths that do not satisfy the condition for total reflection in the light conducting plate 1. Thus, a bright line can effectively be prevented from appearing on the top surface of the light conducting plate 1 near the light source 4.

According to a further preferable configuration of the invention, the step portion 12 of the light reflector 5 is substantially in contact with the edge 13 of the light conducting plate 1. With this configuration, the light emitted from the linear light source 1 can efficiently be introduced into the light conducting plate 1 through the end face.

Figure 10:
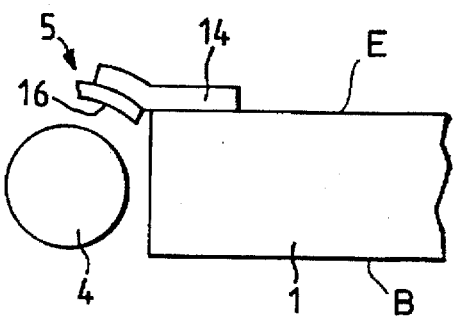

In the invention, the end portion is not always required to have a step portion as described above. But it is sufficient that the end portion of at least part of the light reflector 5 which part is located on the light-exit side satisfy the above-described condition. For example, as shown in FIG. 10, the light reflector is formed of a light reflecting sheet 16 and at least part of at least one of the end portions of the light reflector 5 is bonded to the light exit major surface E of the light conducting plate 1 adjacent to the light incident end face with an adhesive tape 14, for instance.

With this configuration, the light reflector 5 and the light conducting plate 1 can be stably connected to each other, contributing to an improvement in productivity.

Figure 11:
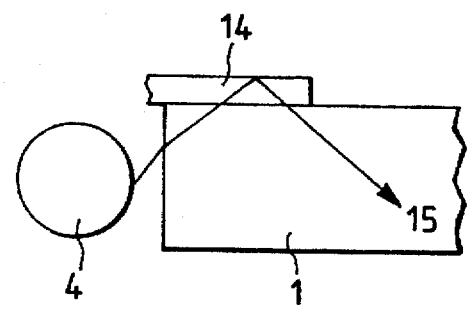
FIG. 11 is a sectional view showing a path of a light ray coming from the surface of a light conducting plate and striking an adhesive tape.

It is preferred that the adhesive tape 14 be substantially transparent. With this configuration, as shown in FIG. 11, light rays 15 coming from the surface of the light conducting plate 1 and striking the adhesive tape 14 are efficiently totally reflected at the boundary between the adhesive tape 14 and the air (usually the backlighting device is used in the air) and returned to the light conducting plate 1. Thus, light rays can be used effectively.

Figure 12:
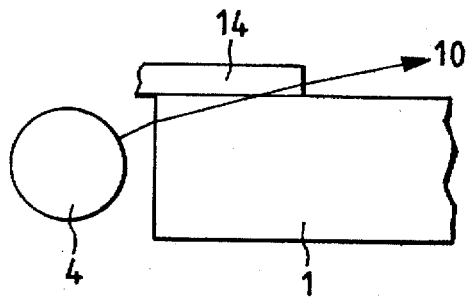
FIG. 12 is a sectional view showing a path of a light ray that exits from an end face of an adhesive tape, to cause a bright line.

It is also preferred that the end face of the adhesive tape 14 be light reflective or absorptive. This can prevent a phenomenon that, as shown in FIG. 12, light rays coming from the surface of the light conducting plate 1 and entering the adhesive tape 14 go out from its end face, to cause a bright line.

In the following, the invention will be described in further detail by way of Examples and a Comparable Example.

As shown in FIG. 5, a cold cathode fluorescent tube 4 of 3 mm in diameter and 180 mm in length (Harrison Electric Co., Ltd.) was disposed adjacent to the shorter-side end face of a 4-mm-thick rectangular acrylic plate 1 (205 mm×160 mm; Delaglass A produced by Asahi Chemical Industry Co., Ltd.). As shown in FIG. 6, the fluorescent tube 4 was surrounded by a light reflector 5 in which a silver film (produced by Reiko Co., Ltd.) was provided on a polycarbonate member so that the light output from a slit (width: 3.9 mm) of the silver film which slit is opposed to the end face of the light conducting plate 1 enters the light conducting plate 1 through the end face.

On the other hand, a pattern of circular dots having a pitch of 1 mm was screen-printed on the back major surface of the light conducting plate 1 with ink containing a light diffusive substance (titania). A screen block copy was produced by CAD under the following conditions. That is, a pattern was drawn so that the coating ratio of the light diffusive substance had the minimum value of 20% at a position close to the linear light source 4 and the maximum value of 95% at a position farthest from the light source 4, and gradually increased from the minimum position to the maximum position.

A 0.13-mm-thick white diffuse-reflecting plate 3 made of polyester (Merinex 329 produced by ICI) was so disposed as to cover the entire surface of the light conducting plate 1 which is coated with the light diffusive substance. A 0.18-mm-thick light diffusing plate (8B36 produced by GE) made of polycarbonate was so disposed as to cover the entire light exit surface of the light conducting plate 1 with its coarser surface located on the side opposite to the light conducting plate 1.

The cold cathode fluorescent tube 4 was driven by an inverter with an AC voltage of 30 kHz and a constant current (tube current: 6 mA). The surface luminance was measured under these conditions with a luminance meter (BM-8 produced by Topcon Corp.). An average luminance of 99 points (uniformly distributed) in the effective light-emitting area was 1,200 cd/m$^2$. Almost no abnormal light-emitting portion (bright line) was observed near the end face of the light conducting plate 1 adjacent to the fluorescent tube 4 (Example 1).

An average luminance as measured using the same devices under the same conditions as in Example 1 except that the end portions of the light reflector 5 had a step portion 8 (see FIG. 7) was 1,200 cd/m$^2$. Almost no abnormal light-emitting portion (bright line) was observed near the end face of the light conducting plate 1 adjacent to the fluorescent tube 4. It became easier, in terms of the mechanism, to keep the positional relationship between the silver film and the light conducting plate 1 (Example 2).

An average luminance as measured using the same devices under the same conditions as in Example 2 except that the parts 9 of the surfaces (opposed to the light conducting plate 1) of the step portions 8 of the light reflector 5 which engage the light conducting plate 1 are darkened or blackened (see FIG. 8) was 1,200 cd/m$^2$. Almost no abnormal light-emitting portion (bright line) was observed near the end face of the light conducting plate 1 adjacent to the fluorescent tube 4. It became easier, in terms of the mechanism, to keep the positional relationship between the silver film and the light conducting plate 1. Further, even if the dimensions of the light reflector 5 had small variations, no bright line was observed (Example 3).

An average luminance as measured using the same devices under the same conditions as in Example 1 except that the end portions of the light reflector 5 were so disposed that the light output from a slit (width: 4.1 mm) of the silver film entered the light conducting plate 1 through the end face (see FIG. 4) was 1,100 cd/m². An abnormal light-emitting portion (bright line) was observed near the end face of the light conducting plate 1 adjacent to the fluorescent tube 4. The maximum luminance at that portion was 2,100 cd/m² (Comparative Example 1).

Figure 13:
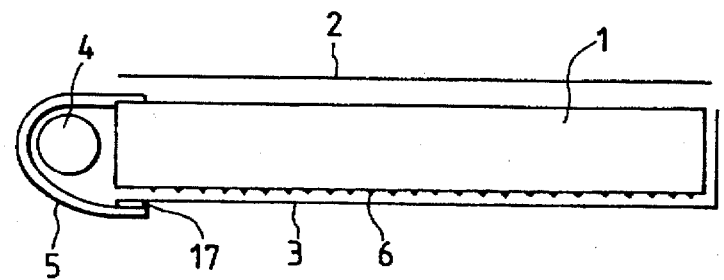
FIG. 13 is a sectional view of a backlighting device according to another embodiment of the invention.

As shown in FIG. 13, a cold cathode fluorescent tube 4 of 3 mm in diameter and 180 mm in length (Harrison Electric Co., Ltd.) was disposed adjacent to the shorter-side end face of a 4-mm-thick rectangular acrylic plate 1 (205 mm×160 mm; Delaglass A produced by Asahi Chemical Industry Co., Ltd.). As shown in FIG. 9, the fluorescent tube 4 was surrounded by a light reflector 5 in which a silver film (produced by Sansei Bussan Co., Ltd.) was provided on a polycarbonate member, and a step portion 12 of the light reflector 5 was so disposed as to be opposed to an edge 13 formed by the light incident end face and the light exit surface of the light conducting plate 1. The other end portion of the light reflector 5 was bonded, with a double-sided adhesive tape 17, to the surface (on the side opposite to the light conducting plate 1) of a diffuse-reflecting sheet 3 that covered the back major surface of the light conducting plate. 1.

On the other hand, a pattern of circular dots having a pitch of 1 mm was screen-printed on the back major surface of the light conducting plate 1 with ink containing a light diffusive substance (titania). A screen block copy was produced by CAD under the following conditions. That is, a pattern was drawn so that the coating ratio of the light diffusive substance had the minimum value of 20% at a position close to the linear light source 4 and the maximum value of 95% at a position farthest from the light source 4, and gradually increased from the minimum position to the maximum position.

A 0.13-mm-thick white diffuse-reflecting plate 3 made of polyester (Merinex 329 produced by ICI) was so disposed as to cover the entire surface of the light conducting plate 1 which is coated with the light diffusive substance. A 0.18-mm-thick light diffusing plate (8B36 produced by GE) made of polycarbonate was so disposed as to cover the almost entire light exit surface of the light conducting plate 1 with its coarser surface located on the side opposite to the light conducting plate 1.

The cold cathode fluorescent tube 4 was driven by an inverter with an AC voltage of 30 kHz and a constant current (tube current: 6 mA). The surface luminance was measured under these conditions with a luminance meter (BM-8 produced by Topcon Corp.). An average luminance of 99 points (uniformly distributed) in the effective light-emitting area was 1,200 cd/m². Almost no abnormal light-emitting portion (bright line) was observed near the end face of the light conducting plate 1 adjacent to the fluorescent tube 4 (Example 4).

An average luminance as measured using the same devices under the same conditions as in Example 4 except that one end portion of a light reflecting sheet 16 (0.05-mm-thick silver film) was bonded to the surface of the light conducting plate 1 adjacent to the light incident end face through a 0.06-mm-thick transparent adhesive tape 14 (see FIG. 10) was 1,200 cd/m². Almost no abnormal light-emitting portion (bright line) was observed near the end face of the light conducting plate 1 adjacent to the fluorescent tube 4. It became easier, in terms of mechanism, to keep the positional relationship between the silver film and the light conducting plate 1 (Example 5).

An average luminance as measured using the same devices under the same conditions as in Example 5 except that the adhesive tape 14 was darkened or blackened was 1,100 cd/m². Almost no abnormal light-emitting portion (bright line) was observed near the end face of the light conducting plate 1 adjacent to the fluorescent tube 4 (Example 6).

An average luminance as measured using the same devices under the same conditions as in Example 5 except that Ag was evaporated on the end face of the adhesive tape 14 was 1,220 cd/m². An abnormal light-emitting portion (bright line) near the end face of the light conducting plate 1 adjacent to the fluorescent tube 4 was weakened from the case of Example 5 (Example 7).

An average luminance as measured using the same devices under the same conditions as in Example 5 except that a black paint was applied to the end face of the adhesive tape 14 was 1,200 cd/m². An abnormal light-emitting portion (bright line) near the end face of the light conducting plate 1 adjacent to the fluorescent tube 4 was weakened from the case of Example 5 (Example 8).

According to the invention, as described above, a compact backlighting device can be provided in which the external dimensions can be made as small as possible with respect to the effective light-emitting area, and which can provide superior legibility.

What is claimed is:

1. A backlighting device for a panel, comprising:

a light conducting plate made of a transparent material, and having a function of outputting light from a light exit major surface thereof;

a linear light source disposed adjacent to at least one end face of the light conducting plate; and a light reflector covering the linear light source, an inner surface of a light-exit-side portion of the light reflector located between the linear light source and the end face of the light conducting plate being disposed inside an extension of the light exit major surface of the light conducting plate, and an outer surface of the light-exit-side portion of the light reflector located between the linear light source and the end face of the light conducting plate being disposed substantially at the same level as or outside the light exit major surface of the light conducting plate, wherein an end portion of the light-exit-side portion of the light reflector has a step portion that engages the light conducting plate.

2. The backlighting device for a panel according to claim 1, wherein portions of the light reflector which extend between the linear light source and the end face of the light conducting plate have a preset length, and further wherein an interval (a), which corresponds to a distance between said portions of the light reflector, is smaller than a thickness of the end face over at least a portion of said preset length.

3. The backlighting device according to claim 2, wherein end portions of the light reflector adjacent to the end face of the light conducting plate are disposed within the thickness of the end face.

4. The backlighting device according to claim 2, wherein a light absorbing portion is provided at least at part of a surface of the step portion of the light reflector which surface is opposed to the light conducting plate.

5. The backlighting device according to claim 1, wherein a light absorbing portion is provided at least at part of a surface of the step portion of the light reflector which surface is opposed to the light conducting plate.

6. The backlighting device according to claim 1, wherein the light reflector comprises a light reflecting sheet, and wherein at least part of a light-exit-side end portion of the light reflecting sheet is bonded to a portion of the light exit major surface of the light conducting plate close to the end face.

7. The backlighting device according to claim 6, wherein the at least part of the light-exit-side end portion of the light reflector is bonded to the portion of the light exit major surface through a substantially transparent adhesive tape.

8. The backlighting device according to claim 7, wherein an end face of the adhesive tape is light reflective or absorptive.

9. The backlighting device according to claim 1, wherein a portion of the light reflector located between the linear light source and the end face of the light conducting plate and on a side opposite to a light exit side is disposed within the thickness of the end face.

10. The backlighting device according to claim 1, wherein the outer surface of the light-exit-side portion of the light reflector is disposed substantially at the same level as the light exit major surface.

* * * * *